(12) United States Patent
Flick (10) Patent No.: US 7,224,083 B2
(45) Date of Patent: May 29, 2007

(54) REMOTE START SYSTEM FOR A VEHICLE HAVING A DATA COMMUNICATIONS BUS AND RELATED METHODS

(75) Inventor: Kenneth E. Flick, Douglasville, GA (US)

(73) Assignee: Omega Patents, L.L.C., Douglasville, GA (US)

( * ) Notice: Subject to any disclaimer, the term of this patent is extended or adjusted under 35 U.S.C. 154(b) by 299 days.

(21) Appl. No.: 11/095,868

(22) Filed: Mar. 31, 2005

(65) Prior Publication Data

US 2005/0179321 A1 Aug. 18, 2005

Related U.S. Application Data (63) Continuation of application No. 10/413,047, filed on Apr. 14, 2003, now Pat. No. 7,031,826, which is a continuation of application No. 09/583,333, filed on May 31, 2000, now Pat. No. 6,812,829, which is a continuation-in-part of application No. 09/382,245, filed on Aug. 25, 1999, now Pat. No. 6,275,147, which is a continuation of application No. 09/023,838, filed on Feb. 13, 1998, now Pat. No. 6,011,460, which is a continuation-in-part of application No. 08/701,356, filed on Aug. 22, 1996, now Pat. No. 5,719,551.

(51) Int. Cl.
*B60R 22/00* (2006.01)
(52) U.S. Cl. .................................................. 307/10.6
(58) Field of Classification Search ................ 307/10.6

See application file for complete search history.

(56) References Cited

U.S. PATENT DOCUMENTS 4,055,772 A 10/1977 Leung ...................... 307/10 R (Continued)

FOREIGN PATENT DOCUMENTS

DE 195 30 721 A1 2/1997

(Continued)

OTHER PUBLICATIONS

Society of Automotive Engineers, Inc., "Surface Vehicle Information Report," SAE J2058 (Jun. 21, 1990).

(Continued)

*Primary Examiner*—Robert L. Deberadinis
(74) *Attorney, Agent, or Firm*—Allen, Dyer, Doppelt, Milbrath & Gilchrist, P.A.

(57) ABSTRACT

The remote start control system may include at least one vehicle device associated with starting an engine of the vehicle, a remote start transmitter, and a vehicle remote start controller connected to the data communications bus for communicating with the at least one vehicle device associated with starting the engine of the vehicle. The remote start controller may be responsive to signals from the remote start transmitter. The vehicle device associated with starting the engine of the vehicle may include at least one controller, such as the engine management controller or the transmission controller, for example. Alternately, or additionally, the at least one vehicle device associated with starting the engine of the vehicle may include at least one vehicle sensor. For example, the vehicle sensor may be one or more of a brake sensor, a transmission sensor, a hood sensor, or an engine speed sensor. The remote start system may also include features to provide compatibility with a number of different vehicles.

21 Claims, 8 Drawing Sheets

U.S. PATENT DOCUMENTS

| | | | |
|---|---|---|---|
| 4,236,594 A | 12/1980 | Ramsperger | 180/167 |
| 4,288,778 A | 9/1981 | Zucker | 340/64 |
| 4,446,460 A | 5/1984 | Tholl et al. | 340/825.69 |
| 4,538,262 A | 8/1985 | Sinniger et al. | 370/85 |
| 4,697,092 A | 9/1987 | Roggendorf et al. | 307/10 R |
| 4,754,255 A | 6/1988 | Saunders et al. | 340/64 |
| 4,760,275 A | 7/1988 | Sato et al. | 307/10 R |
| 4,761,645 A | 8/1988 | Mochida | 340/825.31 |
| 4,792,783 A | 12/1988 | Burgess et al. | 340/22 |
| 4,794,368 A | 12/1988 | Grossheim et al. | 340/63 |
| 4,841,159 A | 6/1989 | Evans et al. | 307/38 |
| 4,897,630 A | 1/1990 | Nykerk | 340/426 |
| 4,926,332 A | 5/1990 | Komuro et al. | 364/424.05 |
| 4,940,964 A | 7/1990 | Dao | 340/438 |
| 5,006,843 A | 4/1991 | Hauer | 340/825.31 |
| 5,024,186 A | 6/1991 | Long et al. | 123/179 B |
| 5,040,990 A | 8/1991 | Suman et al. | 439/34 |
| 5,046,041 A | 9/1991 | Lecocq et al. | 364/900 |
| 5,049,867 A | 9/1991 | Stouffer | 340/426 |
| 5,054,569 A | 10/1991 | Scott et al. | 180/167 |
| 5,081,667 A | 1/1992 | Drori et al. | 379/59 |
| 5,142,278 A | 8/1992 | Moallemi et al. | 340/825.06 |
| 5,146,215 A | 9/1992 | Drori | 340/825.32 |
| 5,243,322 A | 9/1993 | Thompson et al. | 340/429 |
| 5,252,966 A | 10/1993 | Lambropoulos et al. | 340/825.69 |
| 5,406,270 A | 4/1995 | Van Lente | 340/825.34 |
| 5,473,540 A | 12/1995 | Schmitz | 701/1 |
| 5,475,818 A | 12/1995 | Molyneaux et al. | 395/200.05 |
| 5,506,562 A | 4/1996 | Weisner | 340/425.5 |
| 5,521,588 A | 5/1996 | Kuhner et al. | |
| 5,523,948 A | 6/1996 | Adrain | |
| 5,555,498 A | 9/1996 | Berra et al. | 364/424.03 |
| 5,606,306 A | 2/1997 | Mutoh et al. | 340/426 |
| 5,612,578 A | 3/1997 | Drew | 307/10.5 |
| 5,619,412 A | 4/1997 | Hapka | 364/424.045 |
| 5,646,457 A | 7/1997 | Vakavtchiev | 307/10.6 |
| 5,673,017 A | 9/1997 | Dery et al. | 340/426 |
| 5,689,142 A | 11/1997 | Liu | 307/10.5 |
| 5,719,551 A | 2/1998 | Flick | 340/426 |
| 5,721,550 A | 2/1998 | Lopez | 341/176 |
| 5,739,748 A | 4/1998 | Flick | 340/426 |
| 5,757,086 A | 5/1998 | Nagashima | 307/10.6 |
| 5,793,283 A | 8/1998 | Davis | 340/426 |
| 5,811,886 A | 9/1998 | Majmudar | 307/10.2 |
| 5,818,330 A | 10/1998 | Schweiger | 340/426 |
| 5,832,397 A | 11/1998 | Yoshida et al. | 701/29 |
| 5,838,255 A | 11/1998 | DiCroce | 340/825.69 |
| 5,912,512 A | 6/1999 | Hayashi et al. | 307/10.5 |
| 6,812,829 B1 * | 11/2004 | Flick | 340/426.13 |

FOREIGN PATENT DOCUMENTS

| | | |
|---|---|---|
| EP | 0 699 562 A2 | 7/1995 |
| WO | WO 97/28988 | 8/1997 |

OTHER PUBLICATIONS

Society of Automotive Engineers, Inc., "Surface Vehicle Standard," SAE J1850 (rev=d Jul. 1995).

Mark Thompson, "The Thick and Thin of Car Cabling," *IEEE Spectrum*, pp. 42-45 (Feb. 1996).

SAE International, *In-Vehicle Electronics for IVHS Workshop, Speaker Handouts*, Nov. 30 and Dec. 1, 1995.

SAE International, *In-Vehicle Electronics for Intelligent Transportation Systems, Workshop II Results*, Jul. 9-10, 1996.

SAE International, Wolfgang Voss and Karlheinz Butscher, *In-Vehicle Data Bus Systems—the Key for New Concepts In Comfort and Convenience Electronics*, Feb. 26-29, 1996, pp. 1-9.

SAE International, Chuck Powers and Randy Frank, *The Consumerization of the Automotive Environment: The ITS Data Bus*, Aug. 6-8, 1997, pp. 1-7.

* cited by examiner

REMOTE START SYSTEM FOR A VEHICLE HAVING A DATA COMMUNICATIONS BUS AND RELATED METHODS

RELATED APPLICATIONS

The present application is a continuation of U.S. patent application Ser. No. 10/413,047 filed Apr. 14, 2003 now U.S. Pat. No. 7,031,826, which is a continuation of U.S. patent application Ser. No. 09/583,333 filed May 31, 2000, now U.S. Pat. No. 6,812,829, which is a continuation-in-part of U.S. patent application Ser. No. 09/382,245 filed Aug. 25, 1999, now U.S. Pat. No. 6,275,147, which in turn, is a continuation of Ser. No. 09/023,838 filed Feb. 13, 1998, now U.S. Pat. No. 6,011,460, which in turn, is a continuation-in-part of Ser. No. 08/701,356 filed Aug. 22, 1996, now U.S. Pat. No. 5,719,551, the entire contents of each of which are incorporated herein by reference.

FIELD OF THE INVENTION

This application is related to the field of vehicle control systems and, more particularly, to a remote start system and related methods for vehicles.

BACKGROUND OF THE INVENTION

Vehicle security systems are widely used to deter vehicle theft, prevent theft of valuables from a vehicle, deter vandalism, and to protect vehicle owners and occupants. A typical automobile security system, for example, includes a central processor or controller connected to a plurality of vehicle sensors. The sensors, for example, may detect opening of the trunk, hood, doors, windows, and also movement of the vehicle or within the vehicle. Ultrasonic and microwave motion detectors, vibration sensors, sound discriminators, differential pressure sensors, and switches may be used as sensors. In addition, radar sensors may be used to monitor the area proximate the vehicle.

The controller typically operates to give an alarm indication in the event of triggering of a vehicle sensor. The alarm indication may typically be a flashing of the lights and/or the sounding of the vehicle horn or a siren. In addition, the vehicle fuel supply and/or ignition power may be selectively disabled based upon an alarm condition.

A typical security system also includes a receiver associated with the controller that cooperates with one or more remote transmitters typically carried by the user as disclosed, for example, in U.S. Pat. No. 4,383,242 to Sassover et al. and U.S. Pat. No. 5,146,215 to Drori. The remote transmitter may be used to arm and disarm the vehicle security system or provide other remote control features from a predetermined range away from the vehicle. Also related to remote control of a vehicle function U.S. Pat. No. 5,252,966 to Lambropoulous et al. discloses a remote keyless entry system for a vehicle. The keyless entry system permits the user to remotely open the vehicle doors or open the vehicle trunk using a small handheld transmitter.

Unfortunately, the majority of vehicle security systems need to be directly connected by wires to individual vehicle devices, such as the vehicle horn or door switches of the vehicle. In other words, a conventional vehicle security system is hardwired to various vehicle components, typically by splicing into vehicle wiring harnesses or via interposing T-harnesses and connectors. The number of electrical devices in a vehicle has increased so that the size and complexity of wiring harnesses has also increased. For example, the steering wheel may include horn switches, an airbag, turn-signal and headlight switches, wiper controls, cruise control switches, ignition wiring, an emergency flasher switch, and/or radio controls. Likewise, a door of a vehicle, for example, may include window controls, locks, outside mirror switches, and/or door-panel light switches.

In response to the increased wiring complexity and costs, vehicle manufacturers have begun attempts to reduce the amount of wiring within vehicles to reduce weight, reduce wire routing problems, decrease costs, and reduce complications which may arise when troubleshooting the electrical system. For example, some manufacturers have adopted multiplexing schemes to reduce cables to three or four wires and to simplify the exchange of data among the various onboard electronic systems as disclosed, for example, in "The Thick and Thin of Car Cabling" by Thompson appearing in the IEEE Spectrum, February 1996, pp. 42-45.

Implementing multiplexing concepts in vehicles in a cost-effective and reliable manner may not be easy. Successful implementation, for example, may require the development of low or error-free communications in what can be harsh vehicle environments. With multiplexing technology, the various electronic modules or devices may be linked by a single signal wire in a bus also containing a power wire, and one or more ground wires. Digital messages are communicated to all modules over the data communications bus. Each message may have one or more addresses associated with it so that the devices can recognize which messages to ignore and which messages to respond to or read.

The Thompson article describes a number of multiplexed networks for vehicles. In particular, the Grand Cherokee made by Chrysler is described as having five multiplex nodes or controllers: the engine controller, the temperature controller, the airbag controller, the theft alarm, and the overhead console. Other nodes for different vehicles may include a transmission controller, a trip computer, an instrument cluster controller, an antilock braking controller, an active suspension controller, and a body controller for devices in the passenger compartment.

A number of patent references are also directed to digital or multiplex communications networks or circuits, such as may be used in a vehicle. For example, U.S. Pat. No. 4,538,262 Sinniger et al. discloses a multiplex bus system including a master control unit and a plurality of receiver-transmitter units connected thereto. Similarly, U.S. Pat. No. 4,055,772 to Leung discloses a power bus in a vehicle controlled by a low current digitally coded communications system. Other references disclosing various vehicle multiplex control systems include, for example, U.S. Pat. No. 4,760,275 to Sato et al.; U.S. Pat. No. 4,697,092 to Roggendorf et al.; and U.S. Pat. No. 4,792,783 to Burgess et al.

Several standards have been proposed for vehicle multiplex networks including, for example, the Society of Automotive Engineers "Surface Vehicle Standard, Class B Data Communications Network Interface", SAE J1850, July 1995. Another report by the SAE is the "Surface Vehicle Information Report, Chrysler Sensor and Control (CSC) Bus Multiplexing Network for Class 'A' Applications", SAE J2058, July 1990. Many other networks are also being implemented or proposed for communications between vehicle devices and nodes or controllers.

In addition, to vehicle security and remote keyless entry functions, another type of desirable vehicle remote control function is remotely starting the vehicle engine when the owner is away from the vehicle. Such remote starting can be used in cold climates to warm the engine and/or run the passenger compartment heater, to thereby prevent freezing or for the user's comfort. Conversely, remote engine starting can enable the air conditioning to run to cool the vehicle's interior before the vehicle user enters the vehicle.

Unfortunately, conventional vehicle control systems, such as aftermarket remote engine starting systems, are for hardwired connection to vehicle devices and are not readily adaptable to a vehicle including a data communications bus. Moreover, remote starting of the engine presents additional difficulties compared to some other vehicle control applications. This is so because starting the engine may require certain vehicle conditions are correct prior to starting the engine and while the engine is running with the vehicle unattended. It may also be necessary for a remote starter system to bypass an immobilizer device which is part of the security system of some vehicles. For example, U.S. Pat. No. 5,612,578 to Drew entitled "Vehicle Engine Start Control Apparatus Including Interface Device Facilitating Installation and Related Methods" discloses a remote start system which is hardwire connected via mating plugs for more conveniently bypassing an immobilizer circuit based upon a coded resistance of the ignition key.

A remote starter system may also desirably be able to interface with one or more vehicle controllers, such as for engine management and transmission control, for example. In addition, a remote starter system, even if it were adapted for a communications bus and devices for one particular model, model year, and manufacturer, may not be compatible with any other models, model years, or manufacturers.

SUMMARY OF THE INVENTION

In view of the foregoing background it is therefore an object of the invention to provide a remote start control system and related method for a vehicle comprising a data communications bus and at least one vehicle device connected to the data communications bus.

It is another object of the invention to provide such a remote starter system and associated method wherein the system is adapted to operate with different vehicles.

These and other objects, features and advantages in accordance with the present invention are provided by a vehicle remote start control system including at least one vehicle device associated with starting an engine of the vehicle, a remote start transmitter, and a vehicle remote start controller. The vehicle remote start controller is connected to the data communications bus for communicating with the at least one vehicle device. The remote start controller is also responsive to signals from the remote start transmitter to cause starting of the vehicle.

The at least one vehicle device associated with starting the engine of the vehicle may comprise at least one controller, such as the engine management controller or the transmission controller, for example. Alternately, or additionally, the at least one vehicle device associated with starting the engine of the vehicle may comprise at least one vehicle sensor. For example, the vehicle sensor may be one or more of a brake sensor, a transmission sensor, a hood sensor, or an engine speed sensor.

In some embodiments, the vehicle may also include an engine starter circuit, and a security immobilizer circuit connected to the engine starter circuit. The security immobilizer circuit is for selectively enabling the engine starter, such as in response to a coded key or transponder. In such embodiments, the remote start controller may bypass the security immobilizer circuit to enable remote starting.

The remote start transmitter may be a remote handheld transmitter to be carried by a user when away from the vehicle, for example. The remote start signal may also be supplied via a communications network, such as including at least a central station transmitter.

Another aspect of the invention relates to providing compatibility with different vehicle types. The remote start controller may comprise a multi-vehicle compatible remote start controller. The multi-vehicle compatible remote start controller may generate at least one set of command signals on the data communications bus for the at least one vehicle device. The at least one set of command signals may comprise at least one working command signal and at least one non-working command signal for a given vehicle to thereby provide command compatibility with a plurality of different vehicles.

In addition, for reading communications from the vehicle devices, the multi-vehicle compatible remote start controller may store a set of device codes for a given vehicle device for a plurality of different vehicles, read a device code from the data communications bus, and determine a match between a read device code and the stored device codes to thereby provide compatibility with a plurality of different vehicles.

In another embodiment, the multi-vehicle compatibility may be provided by equipping the remote start controller with a desired signal enabling function. This function or feature is for enabling operation using a desired set of signals for a corresponding desired vehicle from a plurality of sets of signals for different vehicles to thereby provide compatibility with a plurality of different vehicles.

A method aspect of the invention is for remotely starting a vehicle engine in a vehicle comprising a data communications bus and at least one vehicle device associated with starting the vehicle engine. The method preferably comprises connecting a vehicle remote start controller to the data communications bus for communicating with the at least one vehicle device, and using the vehicle remote start controller to start the vehicle engine based upon signals received from a remote start transmitter and based upon communication over the data communications bus with the at least one vehicle device.

DETAILED DESCRIPTION OF THE PREFERRED EMBODIMENTS

The present invention will now be described more fully hereinafter with reference to the accompanying drawings in which preferred embodiments of the invention are shown. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime and multiple prime notation are used in alternate embodiments to indicate similar elements.

Figure 1:
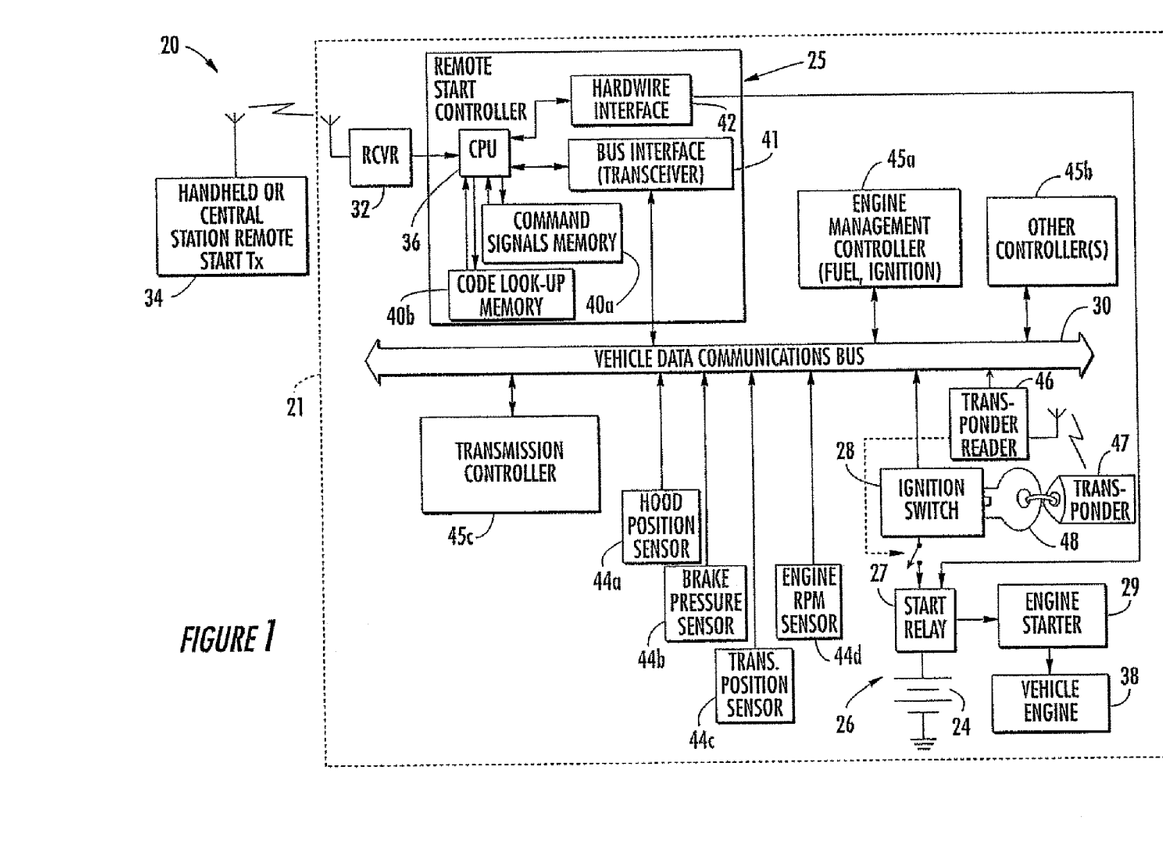
FIG. 1 is a schematic block diagram of a first embodiment of a vehicle remote start control system connected to a data communications bus and other hardwired devices in accordance with the invention.

Referring initially to FIG. 1, a first embodiment of a vehicle remote start control system 20 for use in a vehicle 21 of a type including a data communication bus 30 is now described. The system 20 includes at least one vehicle device associated with starting the engine 22 of the vehicle 21, a remote start transmitter 34, a receiver 32 at the vehicle for receiving signals from the remote start transmitter, and a vehicle remote start controller 25. The vehicle remote start controller 25 is illustratively connected to the data communications bus 30 for communicating with the at least one vehicle device. The controller 25 is also connected to the receiver 32 and is responsive to signals from the remote start transmitter 34 to cause starting of the vehicle.

By remote starting is meant initially starting the vehicle engine 38 and allowing it to idle while unattended by the vehicle owner as will be readily appreciated by those skilled in the art. As will also be appreciated by those skilled in the art, whether the remote start controller 25 will allow the engine 38 to be started and continue to idle may be based upon any of a number of conditions at the vehicle, some representatives examples of which are described in greater detail below.

The at least one vehicle device associated with starting the engine 38 of the vehicle 21 may comprise at least one controller, such as the engine management controller 45a or the transmission controller 45c, for example. One or more other controllers 45b may also be communicated with by the remote start controller 25. Alternately, or additionally, the at least one vehicle device associated with starting the engine 38 of the vehicle 21 may comprise at least one vehicle sensor 44a-44d. For example, the vehicle sensor may be one or more of a brake sensor 44b, a transmission sensor 44c, a hood sensor 44a, and an engine speed sensor 44d. Other similar sensors are also contemplated by the present invention.

The remote start controller 25 includes a central processing unit (CPU) 36 which may perform the necessary signal processing and logic functions to control starting and subsequent running or shut-down of the engine 38 as will be appreciated by those of skill in the art. For example, the engine 38 may be prevented from starting or shut down if the gear shift lever is in or moved to a position other than Park.

Similarly, the engine may be shut down if the engine RPM exceeds a predetermined value. In addition, the engine starter 29 may only need be operated until the engine RPM indicates that the engine is running. The engine 38 may be prevented from running or shut down if the vehicle hood is open. Many other vehicle conditions may also be taken into account by the remote start controller 25 as will be appreciated by those skilled in the art. Further details regarding logical operation of the remote start controller 25 based upon exemplary vehicle device conditions may be found in the abovementioned U.S. Pat. No. 5,612,578 to Drew, the entire disclosure of which is hereby incorporated herein by reference.

Of course, the vehicle 21 would typically include an engine starter circuit 26 as illustrated in the lower righthand portion of FIG. 1. The starter circuit 28 may include an ignition switch 28, a starter relay 27 connected to the ignition switch and the vehicle battery 24 for supplying electrical power to the engine starter 29 as will be readily appreciated by those of skill in the art.

The vehicle 21 may also include the illustrated security immobilizer circuit connected to the engine starter circuit 26. The security immobilizer circuit illustratively includes a passive transponder 47 carried adjacent the ignition key 48, and reader 46 for powering and reading the coded signal from the transponder as will be appreciated by those skilled in the art. Such an immobilizer circuit may be of a conventional type and needs no further description herein. The remote start controller 25 includes a hardwired interface 42 connected to the immobilizer to bypass this circuit when remote starting is desired. Thus, the engine starter circuit 26 may be enabled in response to presentation of the properly coded passive transponder 47 in proximity to the reader 46.

Of course, in other embodiments other types of immobilizer circuits can be used. The engine ignition could be disabled by the engine management controller 45a unless a predetermined code from a transponder reader was generated on the data bus 30, for example. In such a system, a code could be generated on the data communications bus by the bus interface 41 of the remote start controller 25 to effectively bypass such a transponder immobilizer operating over the data communications bus 30 as would be readily appreciated by those skilled in the art. The bus interface 41 includes circuitry for interfacing to the proper signal levels and formats on the data communications bus 30 as will be appreciated by those skilled in the art without further discussion herein.

In another example, the coded resistor key approach described in the Drew patent may also be selectively bypassed by the remote start controller 25 to enable remote starting as will be appreciated by those skilled in the art. Other immobilizer circuits and devices may also be readily bypassed to enable starting.

The remote start transmitter 34 may be a small portable unit including a housing, function control switches carried by the housing, a battery within the housing, and the associated transmitter circuitry. This type of remote handheld transmitter is commonly used in conventional vehicle remote start systems. The communications from the remote start transmitter 34 to the receiver 32 at the vehicle is typically a direct radio frequency link, that is, there is no intervening communications links. However, in other embodiments, the remote start transmitter 34 may indirectly communicate with the receiver 32 via other communications infrastructure, such as via satellite, or cellular communications, via the public switched telephone network (PSTN)

and/or over the world wide web or Internet, as will be appreciated by those skilled in the art.

The remote start transmitter 34 may also include one or more central station transmitters, such as may be provided by a satellite transmitter or cellular telephone transmitter, for example. Such a central station transmitter may also be connected to other communications infrastructure.

In some embodiments, the system 20 may optionally include a remote receiver (not shown) in the form of a small handheld device to be carried by the user or at least one central station receiver cooperating with a transmitter (not shown) at the vehicle, such as to provide status information to the user relating to the remote starting.

In the illustrated system 20, various sensors 44a-44d are shown connected to the data bus 30 and which are communicated to and from via the bus interface 41. However, in other embodiments, one or more of these sensors could be directly connected to the hardwire interface 42. This also applies to the various controllers 45a-45c which may also have hardwire interfaces themselves for certain signals or functions as will be readily appreciated by those skilled in the art.

The remote start controller 25 also includes one or more memories 40a, 40b connected to the CPU 36. Although the memories 40a, 40b are illustrated as separate devices, those of skill in the art will recognize that the memories may be combined in a single device or embedded on the same integrated circuit as the processing circuitry of the CPU.

Another aspect of the invention relates to providing compatibility with different vehicle types. As will now be described, the remote start controller 25 may include features such that it can be considered a multi-vehicle compatible remote start controller. The remote start controller 25 incorporating these optional features may generate at least one set of command signals on the data communications bus 30 for at least one vehicle device. The at least one set of command signals may comprise at least one working command signal and at least one non-working command signal for a given vehicle to thereby provide command compatibility with a plurality of different vehicles.

In addition, for reading communications from the vehicle devices, the remote start controller 25 may store a set of device codes for a given vehicle device for a plurality of different vehicles, read a device code from the data communications bus 30, and determine a match between a read device code and the stored device codes to thereby provide compatibility with a plurality of different vehicles.

Figure 2:
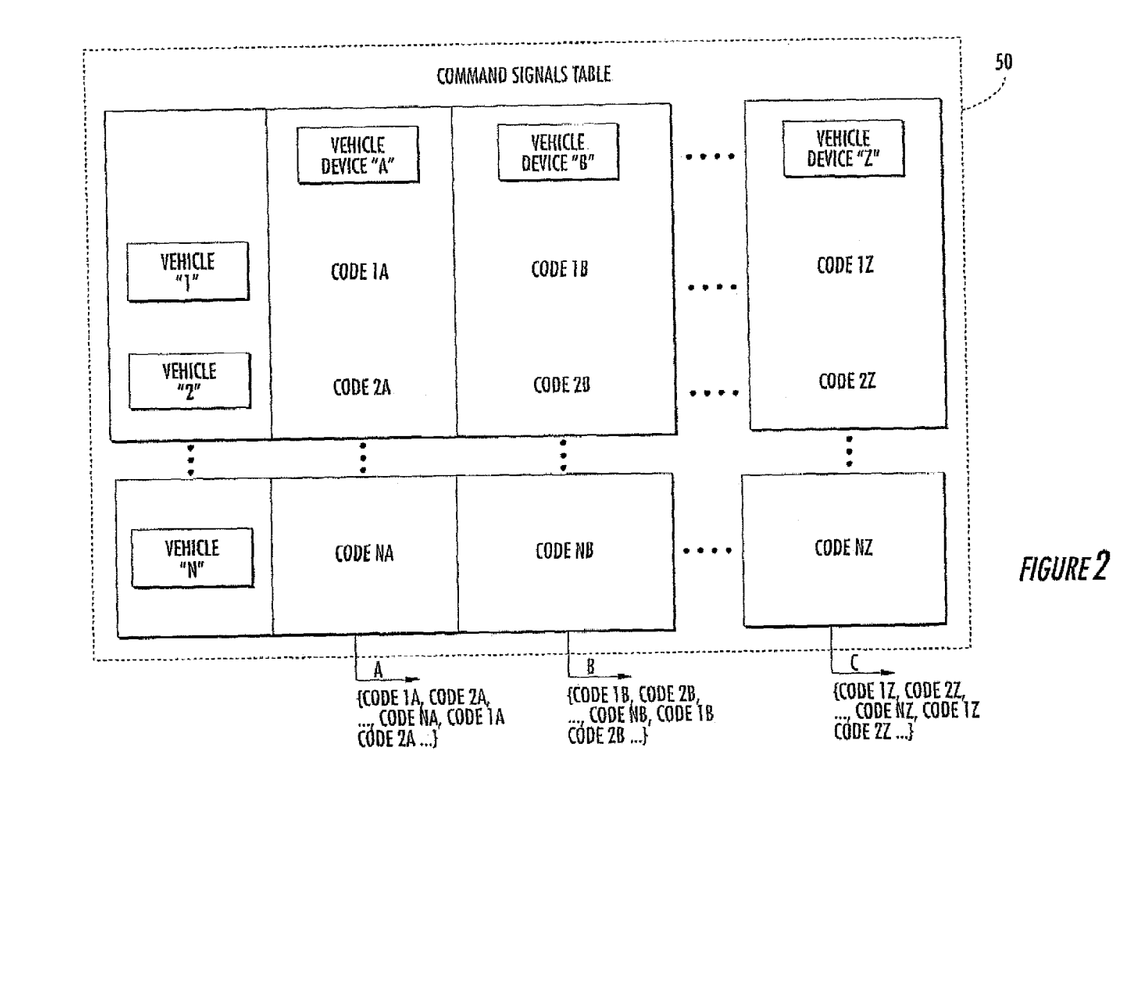
FIG. 2 is a schematic diagram illustrating processing of command signals generated on the data communications bus in the remote start control system of FIG. 1.

The vehicle 21 includes a number of electrical/electronic devices 44a-44d and 45a-45c that can be controlled and/or the status thereof read via the data communications bus 30. The remote start controller 25 may provide its multi-vehicle compatibility in one or both directions of communications via the data communications bus 30. Referring now additionally to FIG. 2, the drive or generation of signals on the data bus portion of communication is now further described. The remote start controller 25 illustratively includes a command signal memory 40a, and the bus interface 41 which can provide both directions of communications.

In accordance with this aspect of the invention, the remote start controller 25 preferably generates at least one set of command signals on the data communications bus 30 for the at least one vehicle device. The at least one set of command signals preferably comprises at least one working command signal and at least one non-working command signal for a given vehicle to thereby provide compatibility with a plurality of different vehicles. In other words, multiple signals or codes can be generated on the data communications bus 30, and only that code for the given vehicle and device will cause an operation or response from the vehicle device. This provides for a relatively simple and straightforward approach to interface or cooperate with a vehicle having a data communications bus 30, and wherein the remote start controller 25 is advantageously compatible with a number of different vehicles. Since typically it may be desired to interface to a plurality of vehicle devices, the remote start controller 25 may generate a respective set of command signals for each of the vehicle devices.

Such multi-vehicle compatibility provided by the remote start controller 25 is especially advantageous in after-market remote start systems. The ability to interface through the data communications bus 30 also significantly reduces the wiring complexity needed to interface to the associated vehicle devices.

The remote start controller 25 may sequentially generate the different command signals (working and non-working) for an intended vehicle device. To ensure effective communications even in the presence of noise, for example, the remote start controller 25 may generate the set of command signals a plurality of times, such as, for example, two to five times. The need to effectively communicate should be balanced against possible traffic congestion on the data bus 30 as will be appreciated by those skilled in the art.

Referring now more specifically to the diagram of FIG. 2, the operation of the remote start controller 25 is further described. The controller 25 may operate by arranging in the command signals memory 40a a common table 50 as shown. The CPU 36 upon determining that an action needs to be performed, such as activating the starter relay 27, for example, would identify the appropriate column from the table 50 from among the columns labeled "vehicle device A" to "vehicle device Z". For example, the appropriate column may be "vehicle device B", in which case the CPU would then read the memory locations in this column to generate on the bus 30 the appropriate set of codes to operate the starter relay for each of the N vehicles with which the remote start controller 25 is compatible. Of course, only one of the codes would be a working code, and the other codes would cause no vehicle function to be performed. For example, if vehicle 21 was the vehicle in which the remote start controller 25 were installed, only the code 2B would cause the starter relay to operate.

The actual coded signals would be compatible with the particular data communications bus 30 as will be appreciated by those skilled in the art. The codes may be binary codes, which for convenience can be represented more simply by corresponding hexadecimal codes as would also be appreciated by those skilled in the art. For example, for an unlock all vehicle doors to be commanded in a 1995 Jeep Grand Cherokee, the code may be 03868004, for a 2000 Jeep Grand Cherokee, the code may be 0422A00400. As will be readily appreciated by those skilled in the art, such codes can be obtained from the manufacturers directly, or may be read from the data bus 30 using any one of a number of commercially available diagnostic tools for reading the data bus 30, for example.

The set of command signals may be repeated as mentioned above, and as schematically illustrated at the lower portion of the table 50. Of course, the memory 40a may store the actual codes, but may also store data enabling generation of the set of command signals by the CPU 36. This may be particularly so where certain portions of the code, e.g. preamble, or some other portion, are common across either multiple vehicles, and/or over multiple vehicle devices.

The number of vehicles and number of devices to be controlled using the multi-vehicle compatibility of the remote start controller 25 can both be relatively large to cover a substantial portion of the vehicle marketplace. Alternatively, the multiple command signal concept may also be advantageously used to provide compatibility for as few as two vehicles, and even a single vehicle device.

Figure 3:
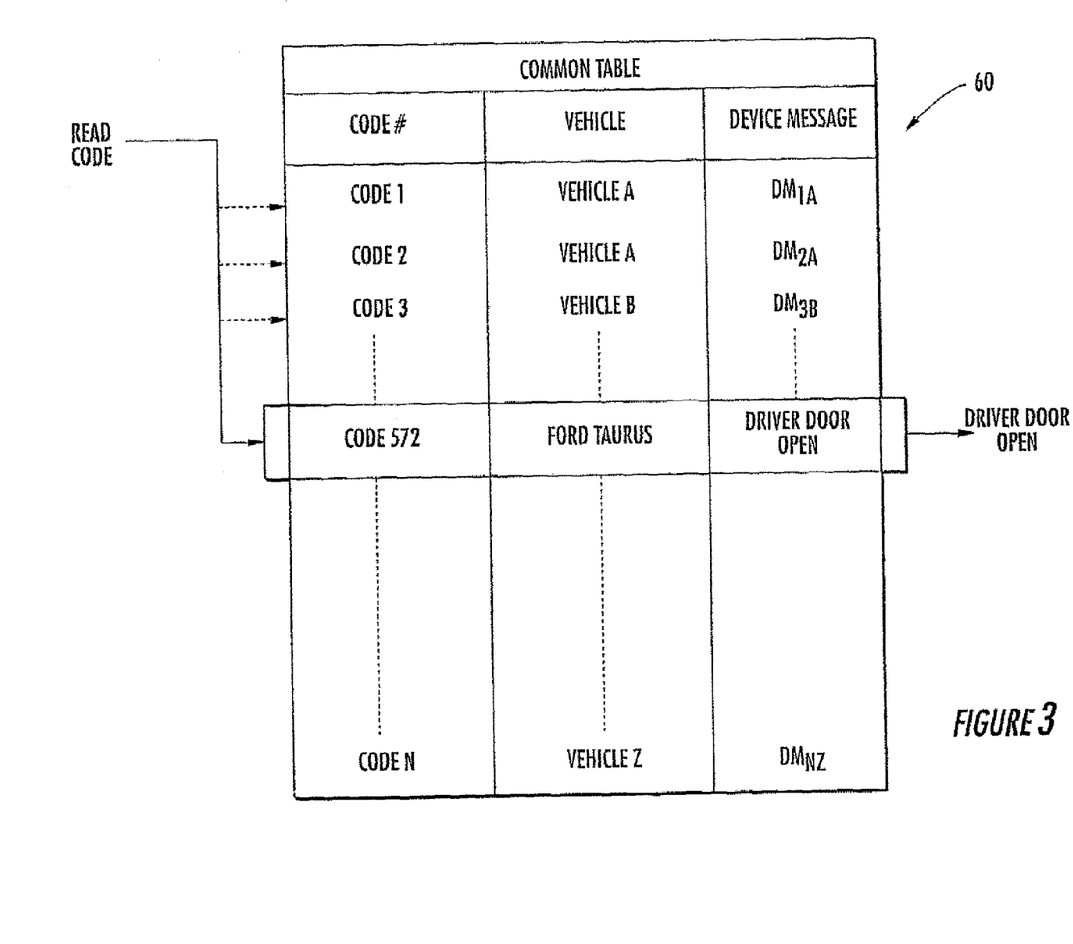
FIG. 3 is a schematic diagram illustrating processing of a code read from the data communications bus in accordance with a first embodiment of the remote start control system of FIG. 1.
Figure 4:
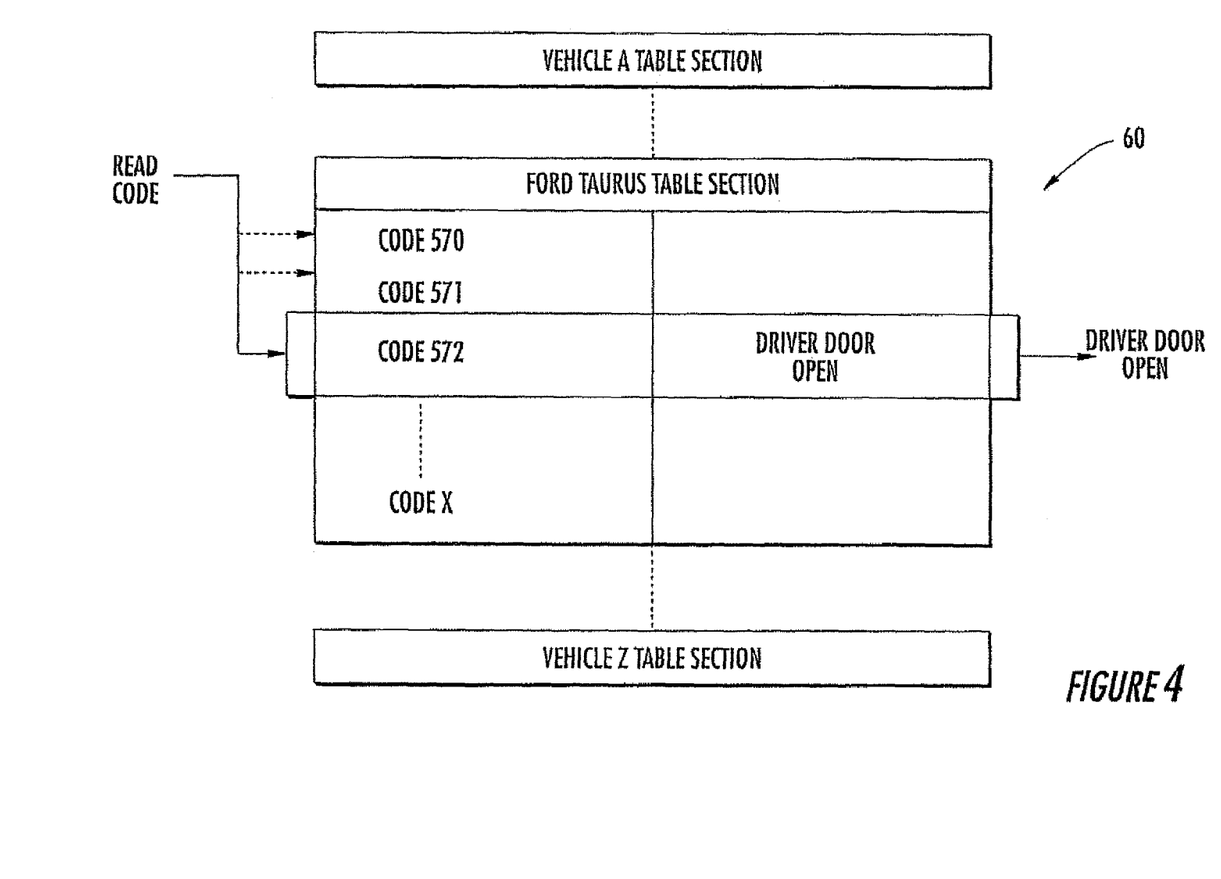
FIG. 4 is a schematic diagram illustrating processing of a code read from the data communications bus in accordance with a second embodiment of the remote start control system of FIG. 1.

Turning now to FIGS. 3 and 4, the other direction of communication is described. In particular, the reverse direction or reading of signals from the data communications bus 30 is now described. Many of the components are the same as those described above, and, hence, need no further description. In the illustrated embodiment, the CPU 36 is connected to a code look-up memory 40b.

The compatibility to read a code and determine the message or content thereof for a vehicle device from among a plurality of vehicles can be used alone or in combination with the compatibility for writing or generating signals on the bus described above. More particularly, the remote start controller 25" is for storing a set of device codes for a given vehicle device for a plurality of different vehicles, for reading a device code from the data communications bus 30, and for determining a match between a read device code and the stored device codes to thereby provide compatibility with a plurality of different vehicles. Such an arrangement provides for a relatively simple and straightforward approach to interface with a vehicle having a data communications bus 30.

The remote start controller 25 may comprise the code look-up memory 40b for the stored device codes, and the processor or CPU 36 cooperating with the memory for determining the match between the read device code and the stored device codes. The at least one vehicle device may include a plurality of vehicle devices, and, accordingly, the memory 40b of the multi-vehicle compatible controller 25 preferably stores a respective set of device codes for each of the plurality of vehicle devices.

Referring now more specifically to FIG. 3, the look-up table feature of the remote start controller 25 is now described. A common table 60 may be created which contains a column for the vehicle codes in some predefined sequence, such as in a numerical order beginning with a first code, Code 1, and ending with a last code, Code N, as illustrated. The central column in the illustrated embodiment includes the corresponding vehicle identification with the vehicles extending from a first vehicle, Vehicle A, to a last vehicle, Vehicle Z. The number of codes and vehicles may be selected so that a given remote start controller 25 is useable across an economically large number of vehicles as will be appreciated by those skilled in the art.

The last or rightmost column in the illustrated table 60 is the device data or message corresponding to the associated vehicle and code. These device messages extend from a first message, $DM_{1A}$, to a last device message, $DM_{NZ}$. The messages may be of many different types, such as driver door open or closed, hood open or closed, shock sensor triggered, brake pressure indicated, gearshift selector in Park, etc. as will be appreciated by those skilled in the art.

By way of example, the common table 60 includes a blocked row schematically illustrating a match for a Code 572. This code is for a Ford Taurus and indicates that the driver's door is open. This type of data may be useful for remote starting. The CPU 36 would read the code on the data bus 30 and compare the code against the stored codes to determine a match. The CPU 36 is likely to buffer some or all of a code when received to subsequently be compared using the table 60 as will be understood by those skilled in the art. In other embodiments, individual bits or blocks thereof may be compared as they are received.

An alternate embodiment of the common table 60 is now explained with reference to FIG. 4. In this case the overall or common table 60', may be considered parsed or divided into a plurality of vehicle table sections. The first table section is for vehicle A, and the last for vehicle Z in the illustrated embodiment. This embodiment also illustrates the driver door for the Ford Taurus as being matched from the read signal from the data communications bus 30. What is of interest in this embodiment, is that upon initial set-up or an initial learning period, only the codes for the learned vehicle need then later be compared to the read code. Accordingly, a time savings may be realized.

Those of skill in the art will recognize that the tables 60 and 60' of FIGS. 3 and 4 are exemplary illustrations from among many possible configurations of look-up tables that may be used in accordance with the present invention. Other configurations are also contemplated by the present invention.

Since it may also be desirable to re-install remote start controller 25 in another vehicle, the controller may be reset and another vehicle learned or configured during an initial set-up. This concept is generally described as an embodiment of a desired signal enabling function or feature in related parent U.S. patent application Ser. No. 09/382,245 filed Aug. 25, 1999, which in turn, is a continuation of U.S. Pat. No. 6,011,460, which in turn, is a continuation-in-part of U.S. Pat. No. 5,719,551, and the disclosure of each of which are incorporated herein by reference in its entirety.

This desired signal enabling is further described below with reference to FIGS. 5-10. The multi-vehicle compatibility may be provided by equipping a remote start controller 55 with a desired signal enabling function 57. This function or feature is for enabling operation using a desired set of signals for a corresponding desired vehicle from a plurality of sets of signals for different vehicles to thereby provide compatibility with a plurality of different vehicles.

Figure 5:
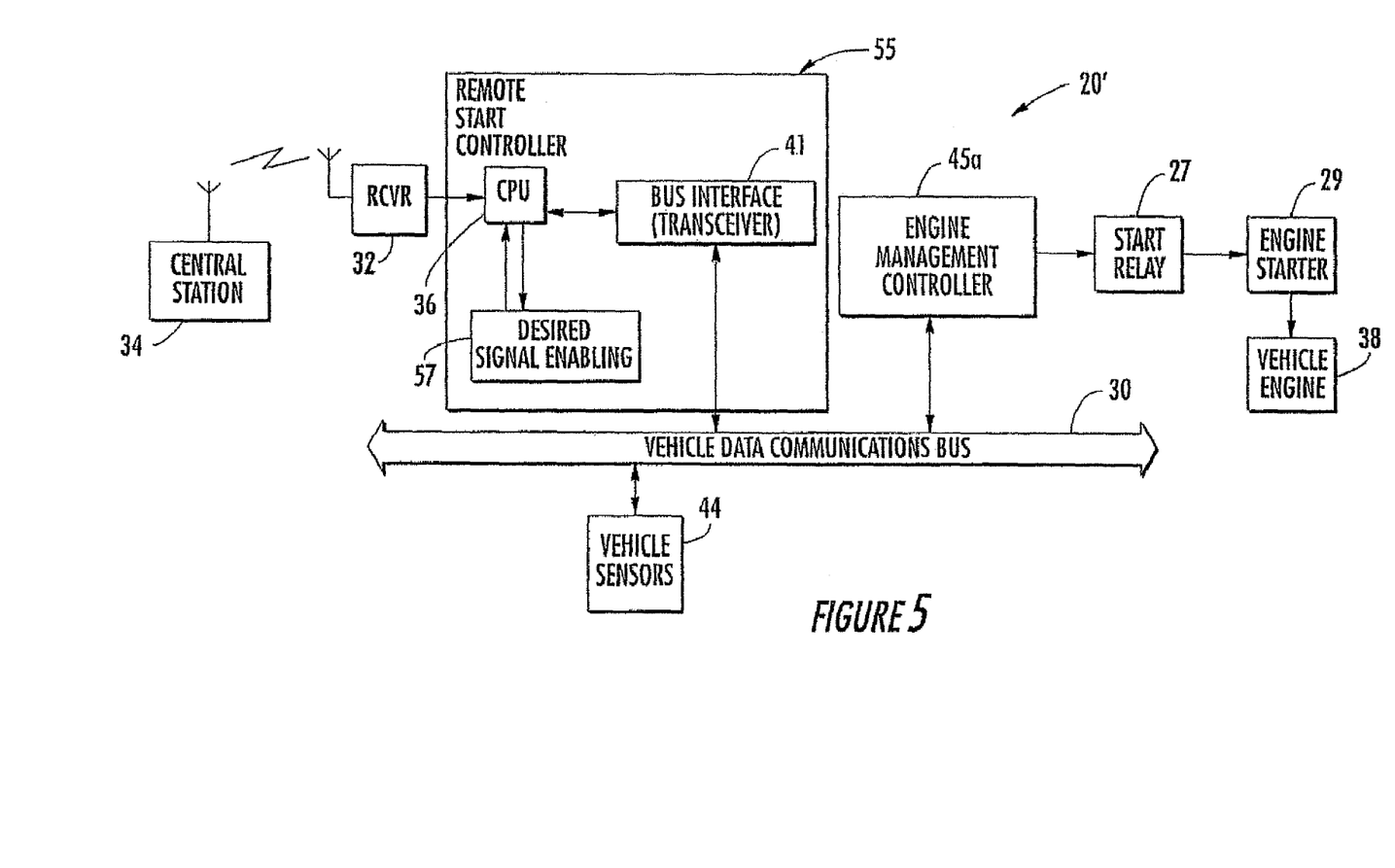
FIG. 5 is a simplified schematic block diagram of a second embodiment of a vehicle remote start control system connected to a data communications bus in accordance with the invention.

The remote start system 55 does not show or necessarily include the hardwire interface described above. Rather, in this embodiment, the remote start function is implemented by the remote start controller 55 via communication with the engine management controller 45a which, in turn, is directly connected to the starter relay 27.

Figure 6:
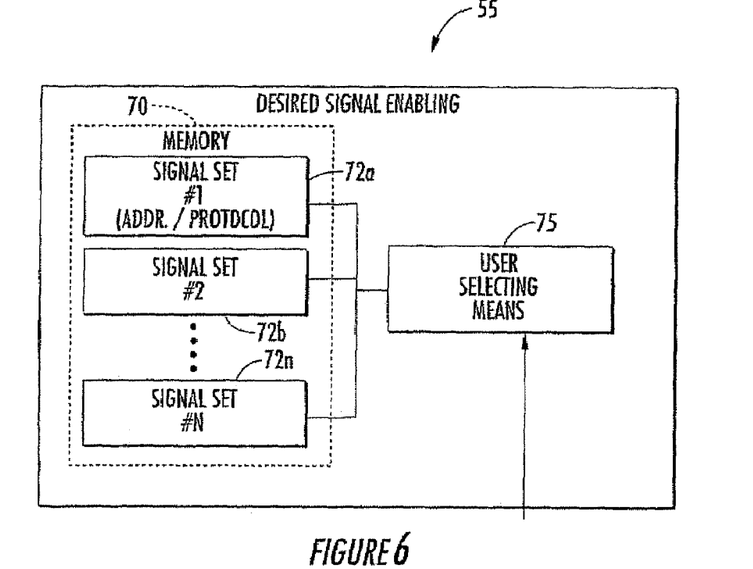
FIG. 6 is a schematic block diagram of a first embodiment of a desired signal enabling portion of the vehicle remote start control system of FIG. 5.

Turning now additionally to FIG. 6 a first embodiment of the desired signal enabling means 57 is described. The signal enabling means 57 is for enabling the remote start controller 55 to operate using a desired set of signals for a desired vehicle from among a plurality of possible sets of signals for different vehicles. As would be readily understood by those skilled in the art, the term different vehicles may include vehicles from different manufacturers, different models, or even different trim levels of the same make and model. Accordingly, the desired signal enabling means 57 permits the remote start controller 55, that is, the CPU 36 and bus interface 41, to communicate with the vehicle sensor 44, engine management controller 45a or other vehicle device via the data communications bus 30 so that the CPU is capable of starting the vehicle engine 38 responsive to the receiver 32 receiving a remote start signal from the remote transmitter 34.

As illustrated in FIG. 6, one embodiment of the desired signal enabling means 57 may preferably include a memory 70 for storing a plurality of sets 72a, 72b and 72n of signals for different vehicles, and selecting means for selecting the desired set of signals from the plurality of different sets of signals for different vehicles. By storing sets of signals is meant storing information or data necessary to generate the desired signals on the data bus 30 as would be readily understood by those skilled in the art. The memory 70 may include device address memory means for storing a plurality of different sets of signals representative of different device addresses for different vehicles. Alternatively, or in addition thereto, the memory means may comprise protocol memory means for storing a plurality of different protocols for different vehicles.

In the illustrated embodiment of FIG. 6, the selecting means may comprise user selecting means 75 for permitting a user to select the desired set of signals. A keypad or other input means may be used to permit the user to select the desired signal set for his vehicle. A valet switch or other control switch, such as on the remote start controller, for example, may also be operated by the user to select the desired signal set. The user may select the desired set of signals by entering a unique digital code similar to the selection of signals for a home electronics universal remote control. Other techniques for permitting the user to select the desired signal set from a plurality of stored sets are also contemplated by the invention as would be readily appreciated by those skilled in the art.

Figure 7:
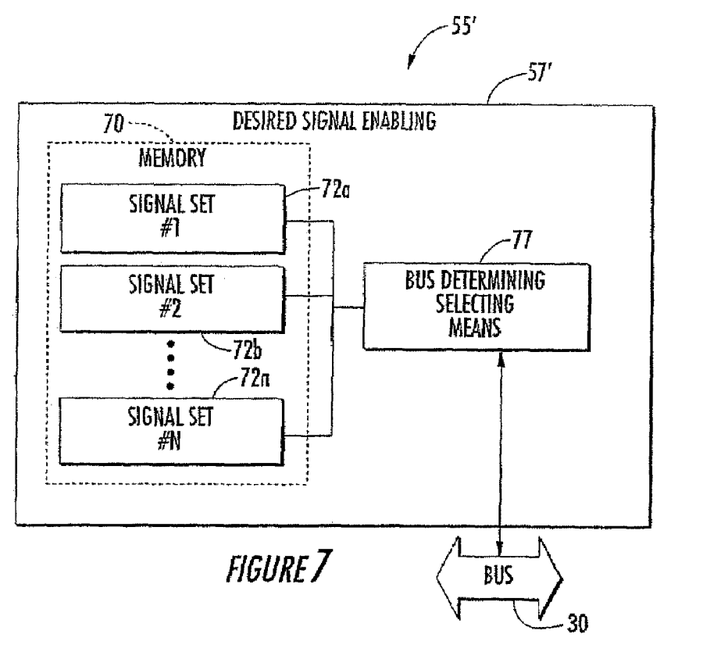
FIG. 7 is a schematic block diagram of a second embodiment of a desired signal enabling portion of the vehicle remote start control system of FIG. 5.

Referring now additionally to FIG. 7 another embodiment of the desired signal enabling means 57' is described in accordance with the remote start controller 55' of the present invention. In this embodiment, the selecting means may comprise bus determining means 77 for determining the desired set of signals based upon signals on the data communications bus. For example, the bus determining means could determine the desired set of signals based upon sensed voltage levels or based upon the timing of signal pulses on the data communications bus 30. The other components of this embodiment of the desired signal enabling means 57' are similar to those described above with reference to FIG. 6 and need no further description.

Figure 8:
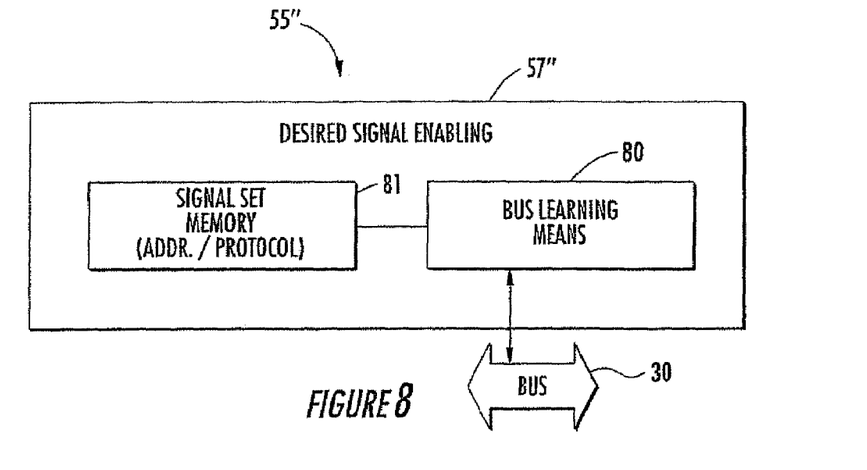
FIG. 8 is a schematic block diagram of a third embodiment of a desired signal enabling portion of the vehicle remote start control system of FIG. 5.

Yet another embodiment of the security system 55" according to the invention is explained with reference to FIG. 8. In this illustrated embodiment the desired signal enabling means 57" includes a desired signal set memory 81 operatively connected to the illustrated bus learning means 80. The bus learning means 80 may determine and store in the signal set memory 81 the protocol and/or device addresses for the vehicle devices. For example, the bus learning means 80 may permit the user to operate various vehicle devices and store a desired signal set based thereon as would be readily understood by those skilled in the art. The other components of the desired signal enabling means 57" are similar to those described above with reference to FIG. 6 and need no further description.

Figure 9:
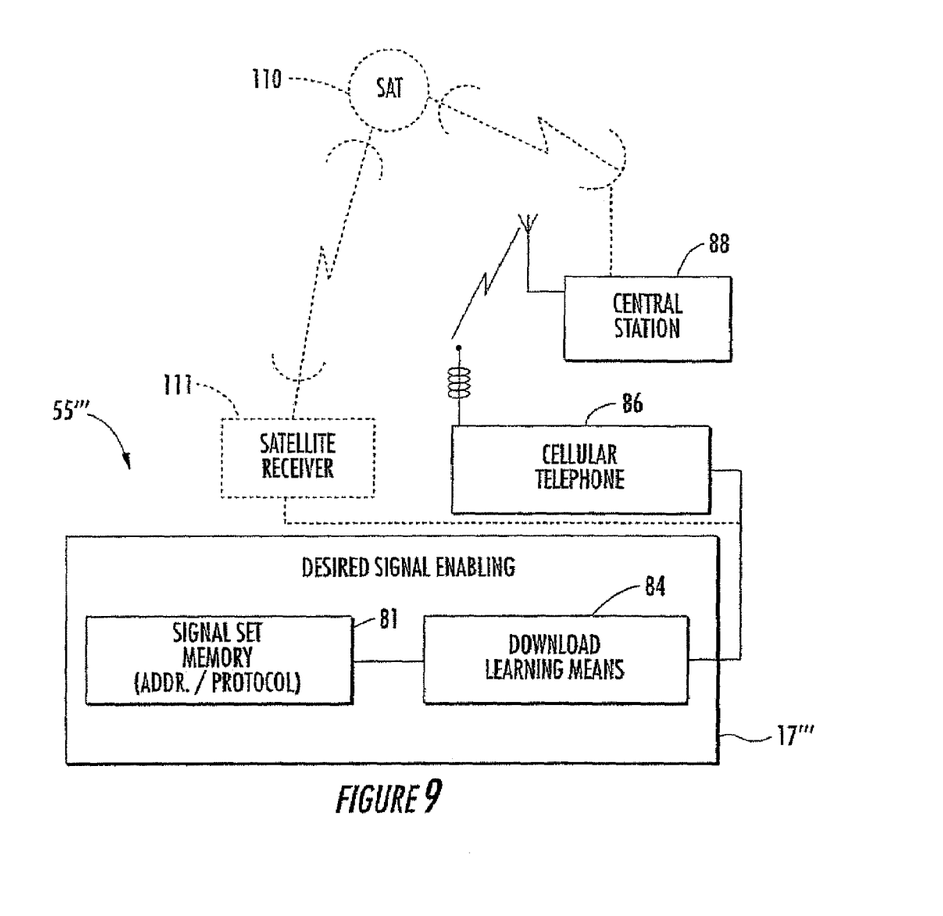
FIG. 9 is a schematic block diagram of a fourth embodiment of a desired signal enabling portion of the vehicle remote start control system of FIG. 5.

Still another embodiment of the desired signal enabling means 57''' is explained with reference to FIG. 9. The desired signal enabling means 57''' includes a signal set memory 81 operatively connected to the schematically illustrated download learning means 84. The download learning means 84 may include an interface connected to the illustrated vehicle cellular telephone 86 to permit learning or downloading of the desired signal set from a remote or central monitoring and control station 88, for example. The desired signal set may also alternately be learned from the central station 88 through the satellite link provided by the satellite 110 and vehicle mounted satellite receiver 111 and associated antennas. As would be readily understood by those skilled in the art, the download learning means, as well as the other desired signal enabling means may be implemented by software in the CPU of the remote start controller 55''' or in a separate microprocessor or circuits.

Figure 10:
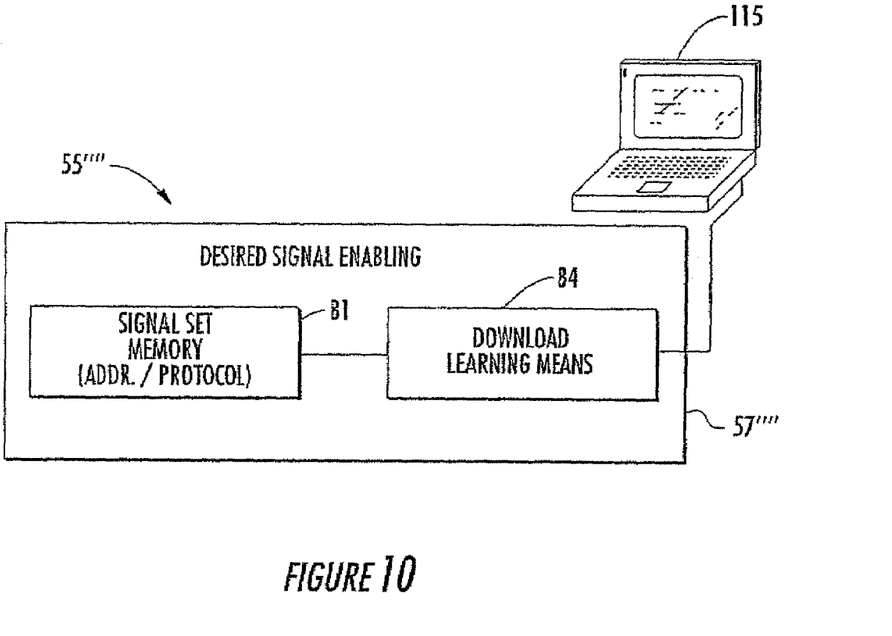
FIG. 10 is a schematic block diagram of fifth embodiment of a desired signal enabling portion of the vehicle remote start control system of FIG. 5.

Turning now additionally to FIG. 10, yet another variation of programming, learning or downloading of the download learning means 84 is explained. In this variation the download learning means 84 is temporarily connected to a computer, such as the illustrated portable laptop computer 115. The connection, may be via a wire cable or wireless communications link as will be readily understood by those skilled in the art. Of course, the desired signal enabling means 57"" in this embodiment may be programmed in the vehicle or prior to installation in the vehicle.

Returning now again to FIG. 1, we again revisit the command signal concept for driving the communications bus 30 with a plurality of signal codes to provide the multi-vehicle compatibility. In another embodiment, the remote start controller 25 could be segmented or divided into two sections or portions. More particularly, the multi-vehicle compatibility may be provided by a multi-vehicle compatible adaptor which would include the CPU 36, the command signal memory 40a, and optionally the bus interface 41. The adaptor may also include its own housing. As will be appreciated by those skilled in the art, one scenario where such an adaptor approach may be especially useful is to adapt a conventional remote start controller to operate via the data communications bus 30. Since the data bus technology is being slowly phased in by automobile manufacturers, suppliers may provide their conventional remote start systems for conventional vehicles, and add such an adaptor with the conventional controller when the vehicle requires interface to the data communications bus 30. The conventional controller may be provided by a conventional remote start controller, or could be an auxiliary output from a vehicle security controller, for example, as will be appreciated by those skilled in the art.

Similar concepts can also be extended to a multi-vehicle compatible adaptor for the other direction of communication, that is, from the data communications bus 30 to one or more vehicle devices. Such an adaptor would include the code look-up memory 40b as described above. Moreover, the operation of such a multi-vehicle compatible adaptor will be readily understood by those of skill in the art based upon the above provided descriptions relating to FIGS. 1-3 without requiring further discussion herein. Of course, as will be appreciated by those skilled in the art, such adaptors may be used independently, may be used together, or may be combined into a single unit.

A method aspect of the invention is for remotely starting a vehicle engine 38 in a vehicle 21 comprising a data communications bus 30 and at least one vehicle device 44a-44d and 45a-45c associated with starting the vehicle engine. The method preferably comprises receiving signals at the vehicle from a remote start transmitter 34, connecting a vehicle remote start controller 25 to the data communications bus 30 for communicating with the at least one vehicle device, and using the vehicle remote start controller to start the vehicle engine 38 based upon signals received from the remote start transmitter and based upon communication over the data communications bus with the at least one vehicle device.

Other features relating to vehicle control systems are disclosed in copending patent applications entitled "MULTI-VEHICLE COMPATIBLE CONTROL SYSTEM GENERATING COMMAND SIGNALS ON A DATA BUS AND ASSOCIATED METHODS", Ser. No. 09/533,332 filed May 31, 2000, now U.S. Pat. No. 6,346,376 and "MULTI-VEHICLE COMPATIBLE CONTROL SYSTEM FOR READING FROM A DATA BUS AND ASSOCIATED METHODS", Ser. No. 09/583,257 filed May 31, 2000, now U.S. Pat. No. 6,713,835, the entire disclosures of which are incorporated herein by reference.

Many modifications and other embodiments of the invention will come to the mind of one skilled in the art having the benefit of the teachings presented in the foregoing descriptions and the associated drawings. Accordingly, it is understood that the invention is not to be limited to the embodiments disclosed, and that other modifications and embodiments are intended to be included within the spirit and scope of the appended claims.

That which is claimed is:

1. A remote start control system for a vehicle comprising a data communications bus extending within the vehicle, and a plurality of vehicle devices communicating with one another over the data communications bus, the plurality of vehicle devices comprising at least one vehicle device associated with starting an engine of the vehicle, the remote start control system comprising:
 a remote start transmitter; and
 a vehicle remote start controller to be connected to the data communications bus extending within the vehicle for communication thereover with the at least one vehicle device associated with starting the engine of the vehicle, said vehicle remote start controller also being responsive to signals from said remote start transmitter.

2. A remote start control system according to claim 1 wherein the at least one vehicle device associated with starting the engine of the vehicle comprises at least one controller.

3. A remote start control system according to claim 2 wherein the at least one controller comprises at least one of an engine management controller, and a transmission controller.

4. A remote start control system according to claim 1 wherein the at least one vehicle device associated with starting the engine of the vehicle comprises at least one vehicle sensor.

5. A remote start control system according to claim 1 wherein the at least one vehicle sensor comprises at least one of a brake sensor, a transmission sensor, a hood sensor, and an engine speed sensor.

6. A remote start control system according to claim 1 wherein the vehicle further comprises art engine starter circuit, and a security immobilizer circuit connected to the engine starter circuit for selectively enabling the engine starter; and wherein said remote start controller bypasses the security immobilizer circuit to enable remote starting.

7. A remote start control system according to claim 1 wherein said remote start transmitter comprises a remote handheld transmitter to be carried by a user when away from the vehicle.

8. A remote start control system according to claim 1 wherein said remote start transmitter comprises at least a central station transmitter.

9. A remote start control system according to claim 1 wherein said remote start controller comprises a multi-vehicle compatible remote start controller.

10. A remote start control system according to claim 9 wherein said multi-vehicle compatible remote start controller generates at least one set of command signals on the data communications bus for the at least one vehicle device; and wherein the at least one set of command signals comprises at least one working command signal and at least one non-working command signal for a given vehicle to thereby provide command compatibility with a plurality of different vehicles.

11. A remote start control system according to claim 9 wherein said multi-vehicle compatible remote start controller stores a set of device codes for a given vehicle device for a plurality of different vehicles, reads a device code from the data communications bus, and determines a match between a read device code and the stored device codes to thereby provide compatibility with a plurality of different vehicles.

12. A remote start control system according to claim 9 wherein said multi-vehicle compatible remote start controller comprises desired signal enabling means for enabling operation using a desired set of signals for a corresponding desired vehicle from a plurality of sets of signals for different vehicles to thereby provide compatibility with a plurality of different vehicles.

13. A method for remotely starting an engine in a vehicle comprising a data communications bus extending within the vehicle, and a plurality of vehicle devices communicating with one another over the data communications bus, the plurality of vehicle devices comprising at least one vehicle device associated with starting an engine of the vehicle, the method comprising:
 connecting a vehicle remote start controller to the data communications bus extending within the vehicle for communication thereover with the at least one vehicle device associated with starting the engine of the vehicle; and
 using the vehicle remote start controller to start the vehicle engine based upon signals from a remote start transmitter and based upon communication over the data communications bus with the at least one vehicle device associated with starting the engine of the vehicle.

14. A method according to claim 13 wherein the at least one vehicle device associated with starting the engine of the vehicle comprises at least one controller.

15. A method according to claim 14 wherein the at least one controller comprises at least one of an engine management controller, and a transmission controller.

16. A method according to claim 13 wherein the at least one vehicle device associated with starting the engine of the vehicle comprises at least one vehicle sensor.

17. A method according to claim 16 wherein the at least one vehicle sensor comprises at least one of a brake sensor, a transmission sensor, a hood sensor, and an engine speed sensor.

18. A method according to claim 13 wherein the vehicle further comprises an engine starter circuit, and a security immobilizer circuit connected to the engine starter circuit for selectively enabling the engine starter; and
 further comprising using the remote start controller to bypass the security immobilizer circuit to enable remote starting.

19. A method according to claim 13 wherein the remote start transmitter comprises a remote handheld transmitter to be carried by a user when away from the vehicle.

20. A method according to claim 13 wherein the remote start transmitter comprises at least a central station transmitter.

21. A method according to claim 13 wherein the remote start controller comprises a multi-vehicle compatible remote start controller.

* * * * *

UNITED STATES PATENT AND TRADEMARK OFFICE
CERTIFICATE OF CORRECTION

PATENT NO. : 7,224,083 B2  
APPLICATION NO. : 11/095868  
DATED : May 29, 2007  
INVENTOR(S) : Kenneth E. Flick Page 1 of 1

It is certified that error appears in the above-identified patent and that said Letters Patent is hereby corrected as shown below:

Column 12, Line 63        Delete: "09/533,332"  
                          Insert: -- 09/583,332 --

Column 12, Line 64        Delete: "6,346,376"  
                          Insert: -- 6,346,876 --

Column 13, Line 1         Delete: "6,713,835"  
                          Insert: -- 6,756,885 --

Signed and Sealed this

First Day of April, 2008

JON W. DUDAS  
*Director of the United States Patent and Trademark Office*